United States Patent [19] [11] 4,344,572
Tyler [45] Aug. 17, 1982

[54] POSITIONING APPARATUS FOR BOOM STRUCTURES

[76] Inventor: Loren E. Tyler, 1165 Oakwood Ave., Benson, Minn. 56215

[21] Appl. No.: 160,677

[22] Filed: Jun. 18, 1980

[51] Int. Cl.$^3$ .............................................. A01C 3/04
[52] U.S. Cl. .................................................. 239/168
[58] Field of Search ................ 239/159, 164, 166–168, 239/172

[56] References Cited

U.S. PATENT DOCUMENTS

| | | | |
|---|---|---|---|
| 2,793,909 | 5/1957 | Gerbracht | 299/39 |
| 2,794,678 | 6/1957 | Busey et al. | 299/30 |
| 2,965,304 | 12/1960 | Krause | 239/166 |
| 3,055,594 | 9/1962 | Nansel | 239/161 |
| 3,107,055 | 10/1963 | Palmer | 239/164 |
| 3,223,330 | 12/1965 | Plante | 239/168 |
| 3,357,642 | 12/1967 | Horton | 239/159 |
| 3,395,503 | 8/1968 | Greenburg et al. | 52/114 |
| 3,447,750 | 6/1969 | Weston | 239/167 |
| 3,514,038 | 5/1970 | McQuinn | 239/165 |
| 3,544,009 | 12/1970 | Schlueter | 239/167 |
| 3,545,678 | 12/1970 | Tangeman | 239/166 |
| 3,580,505 | 5/1971 | Loeffler | 239/168 |
| 3,716,212 | 9/1971 | Fox | 248/278 |
| 3,731,879 | 5/1973 | Dijkhof | 239/167 |
| 3,807,676 | 4/1974 | Bieker et al. | 248/285 |
| 3,887,132 | 6/1975 | Widmer | 239/166 |
| 3,927,832 | 12/1975 | Robison et al. | 239/168 |
| 4,044,952 | 8/1977 | Williams et al. | 239/165 |
| 4,106,700 | 8/1978 | Clark | 239/168 |
| 4,197,999 | 4/1980 | Lammers | 239/166 |

FOREIGN PATENT DOCUMENTS 2256714 8/1975 France ................................ 239/168
2270774 12/1975 France ................................ 239/167

OTHER PUBLICATIONS

Brochure Entitled "Self-Propelled Spray Rig", Allaeys SA., Belgium, 1974.

Primary Examiner—Andres Kashnikow
Attorney, Agent, or Firm—Merchant, Gould, Smith, Edell, Welter & Schmidt

[57] ABSTRACT

A positioning apparatus (18) for boom structures (14, 16) is disclosed. The positioning apparatus (18) is comprised of a fixed frame assembly (24) mounted to vehicle (12), a slideable frame assembly (22) for vertical slideable movement with respect to fixed frame assembly (24), and a pivotable frame assembly (20) for rotatable movement with respect to slideable frame assembly (22). Boom structures (14, 16) are mounted on opposite sides of pivotable frame assembly (20). The pivotal axis of the pivotable frame assembly (20) is above the center of gravity of the pivotable frame assembly (20) and attached boom structures (14, 16) to keep the boom structures (14, 16) pendulously stable when implement (10) strikes a bump in a field. Springs (112, 118) and shock absorbers (120) recenter pivotal frame assembly (20) relative to implement (10). Plates (36, 70) transmit between the vehicle (12) and the boom structures (14, 16) force components parallel to the pivotal axis so as to protect pin (76) from extraneous stress.

18 Claims, 6 Drawing Figures

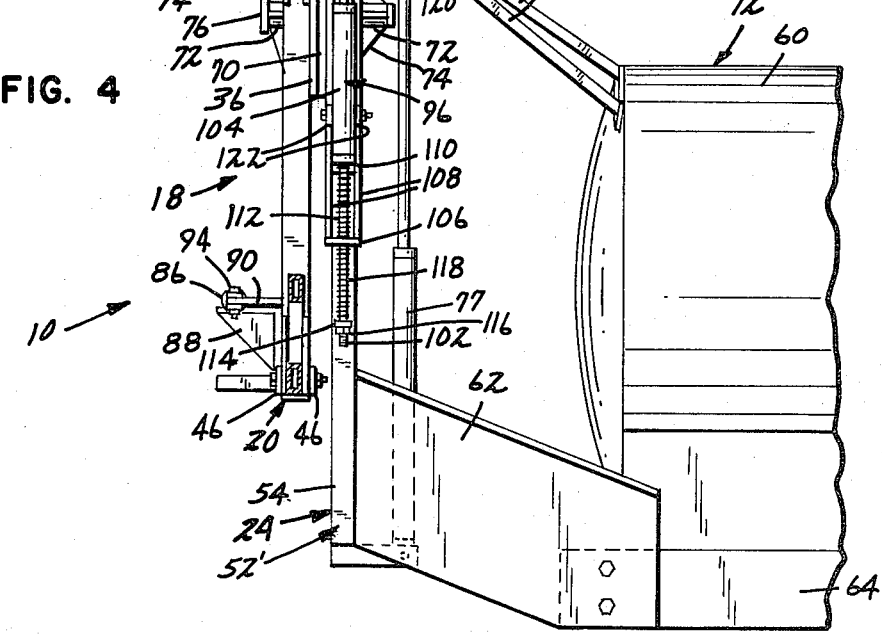

POSITIONING APPARATUS FOR BOOM STRUCTURES

TECHNICAL FIELD

This invention relates to a positioning apparatus for boom structures, especially boom structures carried by a farm implement for the purpose of supporting chemical and fertilizer spray nozzles. For chemical and fertilizer application efficiency, it is appropriate to have spray nozzles a given height above the ground. To save energy and reduce operator time, it is appropriate to drive an implement across a field and spray as wide a swath as possible. The present invention both stabilizes and positions boom structures allowing longer boom structures for a wider swath while maintaining proper nozzle position for good spray coverage and efficiency.

BACKGROUND OF THE INVENTION

Chemicals and fertilizers are commonly applied to agricultural crops. Applicator implements for liquid chemicals and fertilizers commonly include a vehicle, usually self-propelled, with a tank and a plurality of spray nozzles in fluid communication with the tank. Often, the nozzles are supported on a boom structure which extends perpendicularly outward on both sides of the implement. Boom structures which are immovably fixed to the rear of the applicator implement are known in the agricultural industry. Hard-mounted boom structures ordinarily extend no farther than 25 feet on either side of the implement for a swath width of 50 to 55 feet. Boom structures having a support wheel at the end of the boom sometimes extend to 40 feet on each side of the implement.

The length of unsupported, hard-mounted boom structures is limited by the weight and strength of materials used to construct the boom structure. Not only is a boom structure cantilevered from the implement, but it is also subjected to severe bouncing-type impacts each time the implement strikes a rock or furrow in the field. A trade-off exists between structural strength and the capacity of the implement to carry the weight of an increased volume of structural materials. In known devices, the compromise has resulted in boom structures of approximately 25 feet as indicated.

Wheel-supported boom structures often carry more structural materials. However, wheel-supported boom structures continue to be susceptable to impact breakage because of boom bouncing as the wheels follow the contour of a field. Additionally, it is often difficult to control support wheels which are spaced a distance from the implement vehicle.

The width of known applicator boom structures is limited for another reason. Hard-mounted boom structures are held in a fixed relationship with the implement. If the implement strikes a rock or furrow and, consequently, is raised or lowered on one side, the boom structures assume an inclination angle relative to the ground. One end of the boom may actually contact the ground, while the other end may be several feet higher than usual above the ground. The result may be boom structure breakage or an ineffective or possibly detrimental spray pattern. In like manner, when the implement traverses a hillside, the end of the boom structure on the downhill side may contact and dig into the ground. The end of the boom structure on the uphill side may extend several feet higher above the ground than recommended. Again, boom structure breakage or a detrimental spray pattern may result. A poor spray pattern translates into poor crop yield.

Boom structures having support wheels are also subject to delivering poor spray patterns in that the wheels may not travel at a uniform speed and are subject to bouncing. Whenever a support wheel accelerates or decelerates relative to the implement, the chemical or fertilizer applied will be lesser or greater, respectively. Also, whenever the wheel causes the boom structure to bounce, the spray pattern will again be affected.

In addition, known boom structures for implement applicators, whether hard-mounted or wheel-supported, are maintained at a constant elevation with respect to the ground. It is ordinarily a laborious and time-consuming task to change the elevation when moving the applicator implement from one field to another.

A need exists, therefore, to stabilize boom structures of implement applicators to reduce the possibility of boom structure breakage and to insure uniformly efficient spray patterns. Furthermore, any increase in width of boom structures without loss of efficiency would result in less fuel usage and operator time expended.

SUMMARY OF THE INVENTION

The present invention is directed to a vehicle which travels over the ground and includes a boom, means for pivotally supporting the boom on the vehicle, and means for positioning the boom in a preselected position with respect to the ground. The preselected position includes a preselected vertical height and a preselected inclination angle with respect to the ground. Means for maintaining approximately the preselected inclination angle regardless of the orientational circumstance of the vehicle is also included.

In a preferred embodiment, apparatus in accordance with the present invention includes three interconnected frame assemblies. A pivotable frame assembly supports a boom structure from each of opposite sides. The pivotal frame assembly is supported by a slideable frame assembly. A fixed frame assembly is hard-mounted to the applicator implement and supports the slideable frame assembly.

The fixed frame assembly includes two spaced apart, upstanding tube members. The slideable frame assembly includes vertical tube members fitted about the upstanding tube members for sliding movement thereon. A first hydraulic cylinder is attached in a substantially vertical orientation between the fixed frame assembly and the slideable frame assembly for raising or lowering the slideable frame assembly with respect to the fixed frame assembly. In addition, the first hydraulic cylinder holds the slideable frame assembly at any preselected elevated position with respect to the ground.

The pivotable frame assembly includes a first plate oriented approximately perpendicular to the direction of travel of the applicator implement. The slideable frame assembly includes a second plate for sliding contact with the first plate of the pivotable frame assembly. A pin supported by a webbing structure passes substantially perpendicularly through openings in the first and second plates. In this manner, the pin pivotably supports the pivotable frame assembly with respect to the slideable frame assembly. The pin is located so that the center of gravity of the pivotable frame assembly and attached boom structures is beneath the pin. Thus, the pivotable frame assembly and boom structures swing pendulously with respect to the pivotal axis represented by the pin. Furthermore, the first and second plates prevent the long boom structures from rotating independently in a forwardly or rearwardly direction about the attachment mechanism represented by the pin. The plates transmit between the boom structures and the implement vehicle all force components parallel to the pivotal axis of the pivotable frame assembly. The pin is, thus, protected from such force components and subjected to only the weight force of the rotatable frame assembly and boom structures.

A second hydraulic cylinder is attached between the slideable frame assembly and the pivotable frame assembly. The second hydraulic cylinder functions to rotate the pivotable frame assembly with respect to the slideable frame assembly and hold the pivotable frame assembly in a preselected rotated position. One end of the second hydraulic cylinder includes a fixed rod which passes through a collar attached to the slideable frame assembly. A first spring is received about the rod between the end of the hydraulic cylinder and the collar. A second spring is received about the rod between a retaining wall at the other end of the rod and the collar. The two springs function to substantially maintain the preselected rotated position of the pivotable frame assembly. Shock absorbers extend between the pivotable and slideable frame assemblies to dampen any oscillatory motions as a result of the springs.

Third and fourth hydraulic cylinders are attached between the pivotable frame assembly and the boom structures. The third and fourth hydraulic cylinders function to move the boom structures between a transit configuration aligned substantially parallel to the direction of travel of the implement and an operational configuration aligned substantially perpendicular to the direction of travel.

The hydraulic cylinders are operable by a hydraulic system having controls within reach of the operator of the applicator implement.

In operation, the third and fourth hydraulic cylinders are operated to properly align the boom structures with respect to the implement direction of travel. The first hydraulic cylinder is extended to elevate the boom structures a preselected height from the ground. The height often depends on such parameters as the crop to be sprayed, the type of nozzles used, and the type of spray. The applicator implement is then driven across a field to spray a swath. Ordinarily, the second hydraulic cylinder is extended so that the boom structures are parallel with the bottom of the implement and substantially horizontal to the ground.

Whenever the implement encounters a rock or furrow causing the implement to bounce, the pivotable frame assembly and attached boom structures having center of gravity beneath the pivotal axis remain in a relatively constant orientation with respect to the ground while the implement pivots about the pivotal axis. As this occurs, one shock absorber and spring compress, while the other shock absorber and spring extend. When the implement returns to its normal orientation, the springs and shock absorbers automatically center the boom structures about the preselected orientation. Any force components parallel with the pivotal axis are transmitted through the two frame plates, thereby avoiding undue stress on the pin which supports the pivotable frame assembly and boom structures.

Whenever the implement turns a corner, the springs resist the tendency of the pivotable frame assembly and attached boom structures to swing outwardly away from the turn as a result of the centrifugal force. Rather, with appropriately sized springs, one spring compresses while the other extends, thereby countering the centrifugal action and maintain the boom structure in substantially the preselected orientation.

Whenever the implement traverses a hillside, the weight of the pivotable frame assembly and the attached boom structures naturally acts to swing same down the hillside. This causes the vehicle to tilt downward on the downhill side which adds to the tendency of the pivotable frame assembly and boom structures to swing. Again, however, with appropriately sized springs, one spring compresses while the other extends, thereby resisting the pendulous swing. Again, the boom structures are maintained in substantially the preselected orientation.

If the vehicle travels in a tilt orientation with respect to the ground, such as might occur when wheels on one side of the vehicle are in a dead furrow, the boom structures are easily leveled with respect to the ground by extending or retracting as appropriate the second hydraulic cylinder. That is, operation of the second hydraulic cylinder rotates the pivotable frame assembly and attached boom structures to place same in a horizontal orientation with respect to the ground an an inclined orientation with respect to the vehicle. Obviously, this feature of the invention is useful also for spraying terraces.

Thus, a primary advantage of the present invention is the interaction of forces to automatically maintain boom orientation with respect to a preselected orientation.

Another particularly advantageous feature of the present invention is the way in which the pin used to pivotally attach the rotatable and slideable frame assemblies together is protected from extraneous stress forces. The two plates attached to the rotatable and slideable frame assemblies transmit, between the boom structures and the implement, force components parallel to the pivotal axis, thereby protecting the pin from stress to which such torquing forces would otherwise subject it. This principle allows the pin to be used simply as a weight support much like that of a pendulum axis. This in turn allows the boom structures to remain stable during implement pivoting actions caused by impact with rocks or furrows. Boom structure stability results in greater boom length without an increased danger of boom breakage. Boom structure stability also results in consistently efficient spray patterns. The bottom line is increased profits because of increased crop yield due to uniform chemical and fertilizer spray patterns, and because of time and energy savings due to greater boom width resulting in fewer field crossings.

The present invention also includes the advantageous capability of elevating the boom structures to a desirable height above the ground surface and moving the boom structures between transit and operational configurations.

These various advantages and features of novelty which characterize the invention are also pointed out in the claims annexed hereto and forming a part hereof. For a better understanding of the invention, its advantages, and objects obtained by its use, however, reference should be had to the drawings and to the accompanying descriptive matter which form a further part hereof in which there are illustrated and described preferred embodiments of the invention.

BRIEF DESCRIPTION OF THE DRAWINGS

FIG. 3 is a view of the invention from the rear of the vehicle, taken along line 3—3 of FIG. 2;

FIG. 4 is a side view of the invention taken along line 4-4 of FIG. 3;

DETAILED DESCRIPTION OF THE INVENTION

Figure 1:
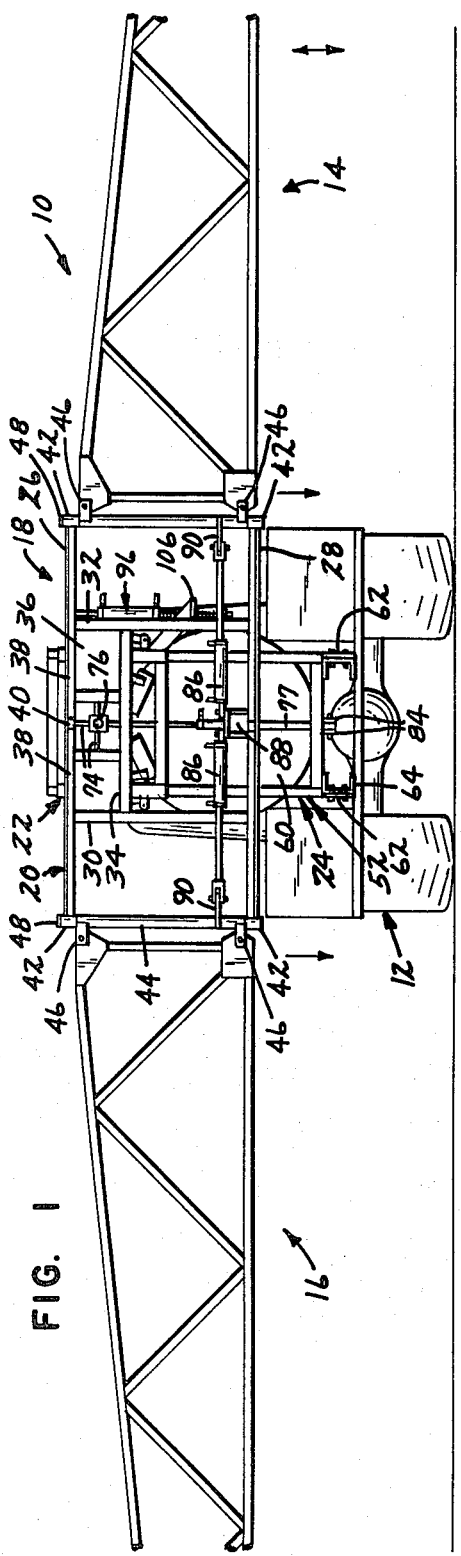
FIG. 1 is a rear view of an applicator implement with a positioning apparatus and attached boom structures in accordance with the present invention.

Referring now to the drawings wherein like reference numerals designate identical or corresponding parts throughout the several views, and more particularly to FIG. 1, an agricultural implement in accordance with the present invention is designated generally as 10. Implement 10 includes a vehicle 12, boom structures 14 and 16, and a positioning apparatus 18 for positioning boom structures 14 and 16 with respect to vehicle 12 and the ground. Farm implement 10 is herein described in terms of a chemical and fertilizer application implement which carries a tank having within it a given chemical or fertilizer. The chemical or fertilizer is typically pumped from the tank and distributed by various hoses or tubes to spray nozzles spaced apart and mounted along boom structures 14 and 16. As implement 10 travels across a field, the chemical or fertilizer is sprayed from the nozzles along a swath having width equal to the distance between the farthest separated ends of boom structures 14 and 16. Although positioning apparatus 18 is described with respect to a chemical and fertilizer applicator implement, it is to be understood that the invention is applicable to other vehicles which support boom structures as well.

As shown in FIGS. 3 and 4, positioning apparatus 18 includes a plurality of frame assemblies. Pivotal frame assembly 20 supports boom structures 14 and 16. Slideable frame assembly 22 supports pivotable frame assembly 20. Fixed frame assembly 24 is attached to vehicle 12 and supports slideable frame assembly 22 as well as rotatable frame assembly 20 and boom structures 14 and 16. Frame assemblies 20, 22 and 24 are each comprised of a plurality of structural members. The structural members may be or include square tubes, round tubes, angles, channels or other structurally shaped and structurally sufficient items. The various structural members may be fastened together with welds, nuts and bolts, rivots or other commonly known fastening elements. It is to be understood, in accordance with engineering principles, that the frame assemblies 20, 22 and 24 may not only be made from a variety of structurally shaped members fastened together by any of several fastening mechanisms, but also may assume a variety of shapes and include more or less numbers of structural members.

In the embodiment shown in FIG. 1, pivotable frame assembly 20 is substantially rectangular with its long sides approximately parallel to the ground. The length of the side of pivotable frame assembly 20 is approximately the same as the width of vehicle 12. The length of the shorter side of pivotable frame assembly 20 is approximately one half the height of vehicle 12 and is somewhat longer than the height of boom structures 14 and 16. Pivotable frame assembly 20 includes upper and lower side members 26 and 28 which extend the length of the longer sides (See FIG. 3). Interior vertical members 30 and 32 are approximately equally spaced from the centerline of implement 10. Interior vertical members 30 and 32 are spaced from one another a distance approximately equal to one half the length of upper and lower side members 26 and 28. Interior vertical members 30 and 32 are fastened at the ends thereof to the upper and lower sides of lower and upper side members 28 and 26, respectively, to form the perimeter of an approximately square space. Interior horizontal member 34 is fastened to and extends between facing sides of interior vertical members 30 and 32 at a height approximately two thirds the distance from lower side member 28 to upper side member 26. A plate 36 having dimensions approximately the same as the outer dimensions of the space defined by upper side member 26, interior vertical members 30 and 32, and interior horizontal member 34 is fastened to the forward side of the indicated members 26–34. To provide additional structural support, as shown in relation to upper side member 26 in FIG. 2, diagonal members 38 extend at an acute angle rearwardly from the ends of upper side member 26 to a longitudinal member 40 extending perpendicularly rearwardly for a short distance from the center of upper side member 26.

Holder members 42 are attached to both ends of upper and lower side members 26 and 28. Holder members 42 have a substantially vertically-oriented, central cylindrical opening (not shown) which is axially aligned between the holder members 42 attached to the same end of upper and lower side members 26 and 28. A rotatable member 44 extends between two aligned holder members 42. Rotatable members 44 have two pairs of plates 46 spaced apart at its upper and lower ends. A portion of boom structure 14 fits between each of the pairs of plates 46 on one rotatable member 44 and is fixedly held with a bolt and nut or other suitable fastening means. Boom structure 16 is fastened to a second rotatable member 44 in a similar fashion. A pin 48, fastened to upper holder member 42 with set screw 50 (see FIG. 3), attaches rotatable members 44 to pivotable frame assembly 20 by passing through an upper holder member 42, a rotatable member 44 and a lower holder member 42. The opening (not shown) in rotatable member 44 in which pin 48 is received may include a plurality of bushings or other similar elements for allowing rotatable member 44 to rotatably slide about fixed pin 48. It is to be understood, of course, that the above-described mechanism for attaching boom structures 14 and 16 to pivotable frame assembly 20 may be accomplished in a variety of other ways as is apparent to those skilled in the art.

As shown in FIG. 3, fixed frame assembly 24 includes a rectangular framework 52 having its longer sides oriented vertically. Rectangular framework 52 is comprised of two spaced apart upstanding members 54 and horizontal separating members 56 attached between upstanding members 54 at the ends thereof. Rectangular framework 52 is laterally centered on implement 10 with upstanding members 54 spaced apart a distance somewhat less than the spaced distance between interior vertical members 30 and 32 of pivotable frame assembly 20. Vehicle 12 supports framework 52 at its top and bottom (see FIG. 4). A plurality of upper support members 58 are attached at one end to upper separating member 56 and at the other end to tank 60 of vehicle 12. A plurality of lower support members 62 are attached at the ends thereof and extend between the frame 64 of vehicle 12 and the lower portion of upstanding members 54.

Slideable frame assembly 22 includes two spaced apart vertical members 66 and a plurality of horizontal members 68 extending therebetween. Vertical members 66 are slideably fitted about upstanding members 54 of fixed frame assembly 24. The upper two horizontal members 68 are spaced apart a distance approximately the same as the distance between upper side member 26 and interior horizontal member 34 of pivotable frame assembly 20. A plate 70 having dimensions approximately the same as the outer dimensions of the space defined by vertical members 66 and the upper two horizontal members 68 is fastened to the rearward side of the indicated members 66 and 68. Vertical members 66 have lengths somewhat greater than the width of plates 36 and 70 to extend somewhat below plates 36 and 70.

Figure 2:
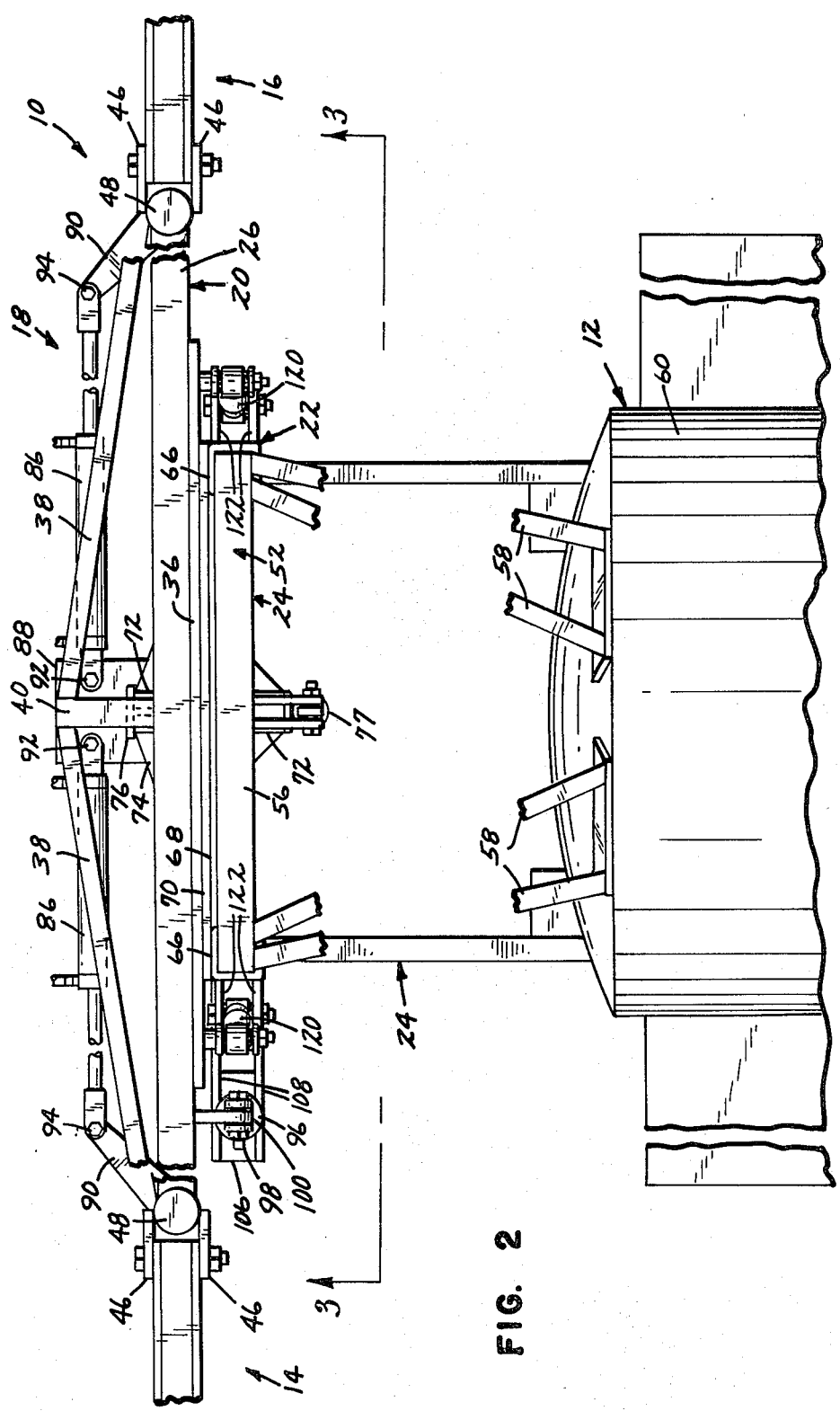
FIG. 2 is a fragmentary top view of the invention shown in FIG. 1.

As shown in FIGS. 2 and 4, plates 36 and 70 are in sliding contact with one another. A block 72 is approximately centered on and attached to the outer side of each of plates 36 and 70. A plurality of triangular plates 74 extend outwardly in a web structure from block 72 to provide structural support between blocks 72 and plates 36 and 70. A pin 76 passes through corresponding openings in blocks 72 and plates 36 and 70 to provide a pivotal axis for pivotal frame assembly 20 with respect to slideable frame assembly 22. Pin 76 is fixed with respect to slideable frame assembly 22. Pivotable frame assembly 20 is supported by and is rotatable about pin 76. Since pin 76 is located relatively high with respect to most of the framework of boom structures 14 and 16 and pivotable frame assembly 20, the center of gravity of that framework is beneath the pivotal axis represented by pin 76.

Slideable frame assembly 22 is moved vertically on upstanding members 54 by a vertically oriented hydraulic cylinder 77. Hydraulic cylinder 77 is attached with nut and bolt combination 78 to a pair ears 80 fastened to top horizontal member 68 of slideable frame assembly 22. At its other end, vertical hydraulic cylinder 77 is attached with nut and bolt combination 82 to a second pair of ears 84 fastened to lower separating member 56 of fixed frame assembly 24.

Boom structures 14 and 16 are movable from a transit configuration in which they are substantially parallel to the direction of travel of implement 10 to an operational configuration in which they are substantially perpendicular to the direction of travel of implement 10. A pair of horizontal hydraulic cylinders 86 extend in opposite directions from a bracket 88, fastened to and centered on lower side member 28 of rotatable frame assembly 20, to bellcranks 90 attached to rotatable members 44. Hydraulic cylinders 86 are attached to bracket 88 with nut and bolt combinations 92 and are attached to bellcranks 90 with nut and bolt combinations 94. Bellcranks 90 are fastened on rotatable members 44 such that boom structures 14 and 16 are in the operational configuration when hydraulic cylinders 86 are in the retracted position and are in the transit configuration when hydraulic cylinders 86 are approximately fully extended.

A torquing hydraulic cylinder 96 is attached between pivotal frame assembly 20 and slideable frame assembly 22. Hydraulic cylinder 96 extends or retracts to apply a force directed substantially perpendicular to the pivotal axis of pivotal frame assembly 20 along a line which does not intersect with the pivotal axis so that the force torques pivotal frame assembly 20 to pivot with respect to slideable frame assembly 22. As shown in FIG. 3, hydraulic cylinder 96 is oriented substantially parallel to the direction of travel of slideable frame assembly 22 and is located to one side of it. The extendable end of hydraulic cylinder 96 is attached with nut and bolt combination 98 to an ear 100 fastened to and extending forwardly from upper side member 26 of pivotable frame assembly 20. A fixed rod 102 extends from the other end of the body 104 of hydraulic cylinder 96. Rod 102 passes through an opening in a collar 106 fastened to a bracket 108 attached to the nearest vertical member 66 of slideable frame assembly 22. The end 110 of hydraulic cylinder 96 from which fixed rod 102 extends functions as a first retaining wall. Spring 112 is partially compressed between first retaining wall 110 and collar 106. A second retaining wall 114 is retained on the free end of fixed rod 102 by a nut 116. A second spring 118 is partially compressed between the other side of collar 106 and second retaining wall 114.

Torquing hydraulic cylinder 96 is operable to rotate pivotable frame assembly 20 with respect to slideable frame assembly 22, or more broadly, with respect to vehicle 12 and the ground. Pivotable frame assembly 20 and attached boom structures 14 and 16 are usually oriented substantially horizontal to the ground. Hydraulic cylinder 96, however, may be operated to pivot pivotable frame assembly 20 and attached boom structures 14 and 16 to a preselected inclination angle with respect to the ground. Springs 112 and 118 yieldably hold and automatically center pivotable frame assembly 20 and attached boom structures 14 and 16 at the preselected inclination angle. Thus, whenever vehicle 12 hits a rock, furrow or other bump thereby causing vehicle 12 to rotate with respect to pivotable frame assembly 20, one of springs 112 and 118 compresses and the other extends to thereafter force pivotable frame assembly 20 to center about the preselected inclination angle as vehicle 12 returns to its original orientation after disengagement with the bump. Shock absorbers 120 attached between pivotable frame assembly 20 and slideable frame assembly 22 on either side of slideable frame assembly 22 function to dampen oscillatory motion between the two frame assemblies caused by springs 112 and 118. Shock absorbers 120 are attached in a standard fashion at one end to upper side member 26 and at the other end to a pair ears 122 extending outwardly from each of vertical members 66 of slideable frame assembly 22.

Figure 5:
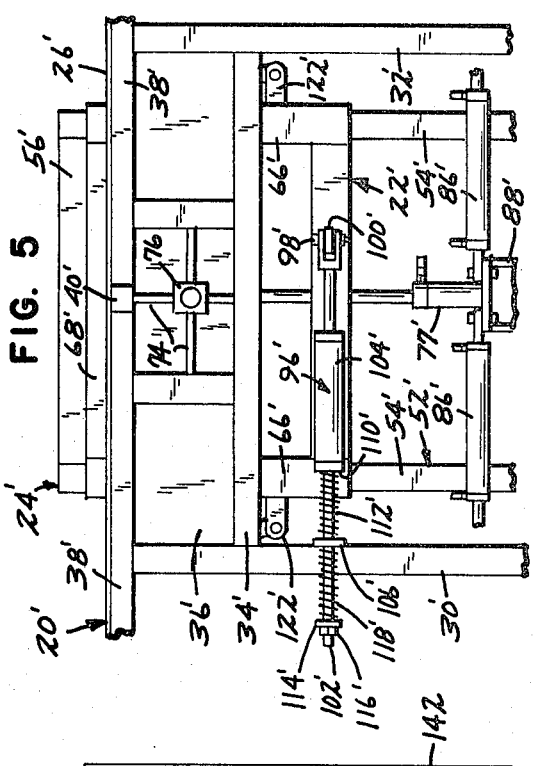
FIG. 5 is an alternate embodiment of the positioning apparatus in accordance with the present invention showing an alternate location for the hydraulic cylinder used to incline the boom structures.

In an alternate embodiment, FIG. 5 shows hydraulic cylinder 96' and centering springs 112' and 118' oriented substantially horizontal, that is, substantially perpendicular to the direction of travel of slideable frame assembly 22. Hydraulic cylinder 96' is attached between slideable frame assembly 22' and pivotable frame assembly 20' in substantially the same fashion as hydraulic cylinder 96 is attached between slideable frame assembly 22 and pivotable frame assembly 20. Furthermore, hydraulic cylinder 96' functions in substantially the same fashion.

Figure 6:
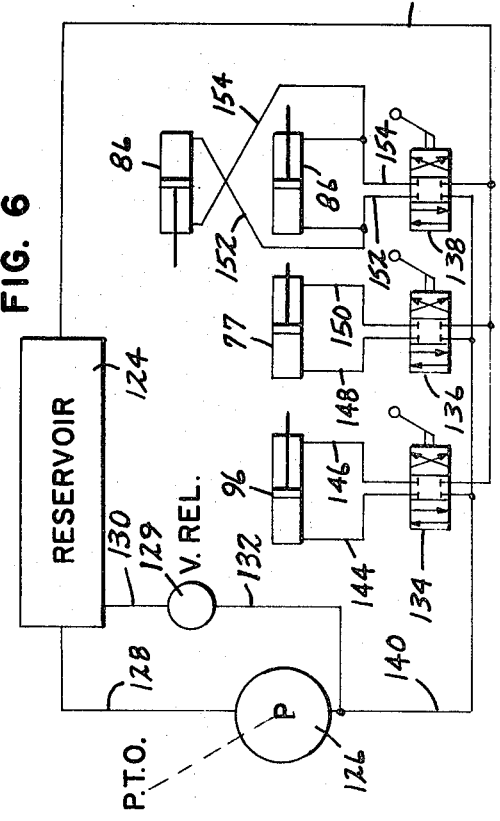
FIG. 6 is a schematic diagram of the hydraulic system.

A schematic diagram of the hydraulic system for controlling the various hydraulic cylinders is illustrated in FIG. 6. A standard type of hydraulic fluid is contained in reservoir 124. The fluid is pumped throughout the system by pump 126 which receives energy from a power takeoff mechanism or other source of mechanical power. The input port of pump 126 is in fluid communication with reservoir 124 via hydraulic line 128. The output port of pump 126 is in fluid communication with reservoir 124 through a relief valve 129 via lines 130 and 132. Three three-position, four-way valves 134, 136, 138 are connected in parallel with relief valve 129 and with each other between pump 126 and reservoir 124. Line 140 provides fluid communication between the output port of pump 126 and the input ports of valves 134, 136, 138. Hydraulic line 142 provides fluid communication between the output ports of valves 134, 136, 138 and reservoir 124. Valve 134 controls torquing hydraulic cylinder 96 via input and output hydraulic lines 144 and 146. Valve 136 controls vertical hydraulic cylinder 77 via input and output hydraulic lines 148 and 150, operating to move slideable frame assembly 22 with respect to fixed frame assembly 24. Valve 138 controls hydraulic cylinders 86 for extending or retracting boom structures 14 and 16 between the transit and operational configurations. Hydraulic cylinders 86 are connected in parallel with valve 138. Fluid communication between valve 138 and hydraulic cylinders 86 is provided by lines 152 and 154. All components in the hydraulic system are standard and are easily assembled using hydraulic fittings and other accessories commonly known to those skilled in the art.

Applicator implement 10 in transit to a field is normally driven with boom structures 14 and 16 oriented substantially parallel to the direction of travel. When implement 10 is positioned in the field to begin operating as intended, the power takeoff unit is engaged to start pump 126. The control handle of valve 138 is moved appropriately to retract the piston rod of hydraulic cylinders 86 thereby pulling bell crank 90 and rotating rotatable members 44 and boom structures 14 and 16 attached thereto. Hydraulic cylinders 86 are retracted until boom structures 14 and 16 are substantially perpendicular to the direction of travel of implement 10. When spraying chemicals or fertilizer on a field, a particular type of nozzle or other equipment may be used. Ordinarily, the nozzles function most efficiently at an optimum height with respect to the ground. Thus, it is appropriate to elevate boom structures 14 and 16 with respect to the ground to position the nozzles at the optimum height. The control handle of valve 136 is moved appropriately to extend or retract the piston rod of hydraulic cylinder 77 to raise or lower slideable frame assembly 22 and its attachments, that is, rotatable frame assembly 20 and boom structures 14 and 16. As hydraulic cylinder 77 extends or retracts, its attachment with the upper horizontal member 68 of slideable frame assembly 22 causes slideable frame assembly 22 to move vertically. Vertical members 66 are guided on and slide with respect to upstanding members 54 of fixed frame assembly 24.

Whenever implement 10 is traveling in a tilted orientation along a field, it may be appropriate to incline boom structures 14 and 16 with respect to vehicle 12 in order to have the greatest number nozzles at the optimum vertical height or to prevent the end of one of the boom structures 14 and 16 from striking the ground or from being raised excessively above the ground. Boom structures 14 and 16 are inclined to a preselected inclination angle by moving the control handle of valve 134 to extend or retract hydraulic cylinder 96 as appropriate. The extension or retraction of hydraulic cylinder 96 applies a force to pivotable frame assembly 20 at a distance from the pivotal axis represented by pin 76 thereby causing a torque which rotates pivotal frame assembly 20 with respect to slideable frame assembly 22 and the rest of implement 10.

In traversing a field, implement 10 commonly strikes rocks, furrows or other imperfections which cause the implement to rotate swiftly and bounce before returning to its normal orientation. Positioning apparatus 18 stabilizes boom structures 14 and 16 during the period that vehicle 12 is experiencing shock motions. Suppose vehicle 12 strikes a rock with its right wheels. The right side of the vehicle will quickly move upward and then downward. The boom structures 14 and 16, however, do not even significantly. When the right side of vehicle 12 moves upwards, the weight of pivotable frame assembly 20 and boom structures 14 and 16 operates as a force at the center of gravity to torque pivotable frame assembly 20 about the pivotal axis in a clockwise direction. This rotative movement relative to slideable frame assembly 22 causes spring 118 to compress and spring 112 to extend. When vehicle 12 returns to its normal orientation after falling off the rock, springs 118 and 112 apply a force to torque pivotable frame assembly 20 in the counter-clockwise direction. At the same time, shock absorbers 120 damp any oscillatory motion caused by springs 118 and 112 and act in combination with springs 118 and 112 to smoothly return the pivotable frame assembly 20 to a centered position on the preselected inclination angle.

During motions caused by shock impacts such as when the implement strikes a rock, there are often force components parallel to the pivotal axis. Such force components can violently operate to pivot the ends of boom structures 14 and 16 about a substantially vertical axis perpendicular to the pivotal axis represented by pin 76. Plates 36 and 70 attached to pivotable and slideable frame assemblies 20 and 22, respectively, are in slideable contact with one another and function to transmit such forces. In this fashion, pin 76 is spared stress from forces other than the naturally-occurring force of the weight of pivotable frame assembly 20 and boom structures 14 and 16. The protection of pin 76 from extraneous forces is a key factor in a stabilization system having a pivotal axis with a boom structure center of gravity vertically lower.

Whenever implement 10 turns a corner, springs 112 and 118 resist the tendency of the pivotable frame assembly 20 and attached boom structures 14 and 16 to swing outwardly under the influence of the centrifugal force. Rather, with springs chosen in accordance with sound engineering principles, one of springs 112 and 118 compresses while the other extends, thereby substantially countering the centrifugal action. Thus, rather than one end of boom structures 14 and 16 contacting the ground while the other end raises undesirably, boom structures 14 and 16 are maintained in substantially the preselected orientation.

Whenever implement 10 traverses a hillside, the weight of pivotable frame assembly 20 and attached boom structures 14 and 16 naturally acts to swing same down the hillside. This causes vehicle 12 to tilt downward on the downhill side which adds to the tendency of pivotable frame assembly 20 and boom structures 14 and 16 to swing. Again, with springs chosen in accordance with sound engineering principles, one of springs 112 and 118 compresses while the other extends, thereby substantially resisting the pendulous swing. Rather than the uphill end of the boom structures contacting the ground and the downhill end raising undesireably, boom structures 14 and 16 are maintained in substantially an orientation parallel to the ground. If a slight unwanted inclination with respect to the hillside is present, operation of torquing hydraulic cylinder 96 rapidly corrects it.

Although numerous characteristics and advantages of the invention have been set forth in the foregoing description, together with details of the structure and function of the invention, it is to be understood that the disclosure is illustrative only. Any changes made, especially in matters of shape, size, and arrangement, to the full extent extended by the general meaning of the terms in which the appended claims are expressed, are within the principles of the invention.

What is claimed is:

1. A positioning apparatus comprising:
   a boom structure;
   frame means for supporting said boom structure;
   means for attaching said frame means to a vehicle;
   means for mounting said boom structure on said frame means for movement about a pivotal axis, said boom structure being mounted with the center of gravity of said boom structure beneath the pivotal axis of said mounting means when the vehicle is on level ground whereby said boom structure automatically seeks an orientation perpendicular to the gravitational force regardless of the orientation of said frame means; and
   means for yieldably counteracting the pivotal movement of said boom structure to maintain said boom structure substantially level with respect to the ground.

2. A positioning apparatus in accordance with claim 1 wherein said mounting means includes an axial member supported by said frame means, said boom structure being pendulously swingable about said axial member.

3. A positioning apparatus in accordance with claim 2 wherein said counteracting means includes a spring attached between said boom structure and said frame means for providing an opposing force to the pendulous movement about said axial member.

4. A positioning apparatus for use on an agricultural implement having a pair of cantilevered boom structures mounted outwardly from opposite sides thereof, said positioning apparatus comprising:
   means for pivoting said boom structures simultaneously with respect to said implement, said pivoting means maintaining said boom structures approximately level with the ground when said implement rotates rapidly as a result of encountering an irregularity in the terrain; and
   means for rotationally self-centering said boom structures with respect to said implement when said implement inclines slowly with respect to the horizontal as during the traverse of inclined terrain thereby keeping said boom structures approximately level with respect to the ground, said self-centering means including a plurality of springs, at least one opposing another, to counteract movement about said pivoting means.

5. In an agricultural implement, the combination comprising:
   a boom;
   first frame means for supporting said boom;
   second frame means, attached to said implement, for supporting said first frame means;
   means for pivotably mounting said first frame means to said second frame means, said mounting means including an axial member having cross-sectional area, said mounting means further including means for transferring forces parallel to said pivotal axis through an area substantially larger than the cross-sectional area of said axial member;
   means for yieldably counteracting the pivotal movement between said first and second frame means, whereby undue stress on said axial member is avoided when extraneous forces parallel to the pivotal axis are transmitted through said larger area and undue stress on said boom is avoided when torquing forces about the pivotal axis are cushioned by said counteracting means.

6. The combination in accordance with claim 5 wherein said first frame means includes a first plate and said second frame means includes a second plate, said first and second plates being in sliding contact with one another, said first and second plates being oriented perpendicular to the pivotal axis of said pivotal mounting means such that the pivotal axis passes through said first and second plates, whereby force components aligned parallel with the pivotal axis of said pivotal mounting means are transmitted between said first and second frame means through said first and second plates.

7. The combination in accordance with claim 6 wherein said first and second plates have non-contact sides opposite those forming the sliding contact between said first and second plates, said first and second plates having a block attached to said non-contact sides of each and a web structure extending outwardly from each said block, said web structure attached to both said block and said respective plate, and wherein said pivotal mounting means includes corresponding openings in said blocks and said plates, said openings being centered on the pivotal axis, said pivotal mounting means further including a pin retained within said openings, said pin for pivotably supporting said first frame means with respect to said second frame means.

8. A positioning apparatus for a pair of cantilevered boom structures mounted on an agricultural implement, said boom structures extending outwardly from opposite sides of said implement, said implement having a longitudinal axis in the direction of travel over the ground, said positioning apparatus comprising:
   pivotable frame means for supporting said boom structures, said pivotable frame means having two sides opposite one another with a said boom structure attached at each side;
   slideable frame means for supporting said pivotable frame means;
   fixed frame means, attached to said implement, for supporting said slideable frame means;
   means for sliding said slideable frame means with respect to said fixed frame means and holding said slideable frame means at a preselected height with respect to the ground;
   means for pivotably attaching said pivotable frame means to said slideable frame means, the pivotal axis of said attaching means being approximately parallel to the longitudinal axis of said implement, said pivotable frame means being attached with the center of gravity of said pivotable frame means and attached said boom structures beneath the pivotal axis of said attaching means; and means for rotating said pivotable frame means about the axis of said pivotal attaching means to a preselected angle with respect to the ground; and means for yieldably self-centering said pivotable frame means about said preselected angle.

9. A positioning apparatus in accordance with claim 8 wherein said attaching means includes a pin having a centerline and cross-sectional area perpendicular thereto, the pivotal axis of said attaching means being identical with the centerline of said pin, said apparatus further including means between said implement and said boom structures for transmitting through an area larger than the cross-sectional area of said pin force components parallel to the pivotal axis, whereby stress on said pin is avoided because force components parallel to the pivotal axis are transmitted through said transmitting means having an area larger than the cross-sectional area of said pin.

10. A positioning apparatus in accordance with claim 8 wherein said rotating means includes an hydraulic cylinder attached between said pivotable and slideable frame means and means for controllably operating said cylinder, said hydraulic cylinder for pivoting said pivotable frame means with respect to said slideable frame means and holding said pivotable frame means in a preselected pivoted position.

11. A positioning apparatus in accordance with claim 10 wherein said hydraulic cylinder has first and second ends, said cylinder including between said first and second ends a body with a first retaining wall at said second end thereof and a rod extending from said first retaining wall, said rod having a second retaining wall fastened thereto spaced from said first retaining wall, said first end being attached to one of said pivotable and slideable frame means and said rod being slidably retained by a collar attached to the other of said pivotable and slideable frame means, said self-centering means further including first and second springs, said first and second springs being received about said rod between said first and second retaining walls, one of said first and second springs being on each side of said collar, whereby said hydraulic cylinder may be operated to pivot said pivotable frame means a preselected amount with respect to said slideable frame means and to hold said pivotable frame means in the preselected pivoted position, said first and second springs yieldably centering said pivotable frame means on the preselected pivoted position.

12. A positioning apparatus in accordance with claim 11 wherein said self-centering means includes shock absorber means, attached between said pivotable and slideable frame means, for damping relative oscillation movements between said pivotable and slideable frame means, whereby when said pivotable and slideable frame means pivot with respect to one another due to an external force, said first and second springs force said pivotal frame means to return to said preselected pivoted position with respect to said slideable frame means, said shock absorber means damping any oscillatory motion due to said springs.

13. A positioning apparatus in accordance with claim 8 wherein said fixed frame means includes two spaced apart, upstanding members and said slideable frame means includes vertical members fitted about said upstanding members, said vertical members being slideable on said upstanding members whereby said slideable frame means may slide with respect to said fixed frame means.

14. A positioning apparatus in accordance with claim 13 wherein said sliding and holding means includes an hydraulic cylinder attached in a substantially vertical orientation between said fixed frame means and said slideable frame means, said sliding and holding means further including means for hydraulically controlling said cylinder, whereby said hydraulic cylinder may be operated to raise or lower said slideable frame means with respect to said fixed frame means and to hold said slideable frame means at a preselected elevated position.

15. A positioning apparatus for a pair of cantilevered boom structures mounted on an agricultural implement, said boom structures extending outwardly from opposite sides of said implement, said implement having a longitudinal axis in the direction of travel over the ground, said positioning apparatus comprising:

pivotable frame means for supporting said boom structures, said pivotable frame means having two sides opposite one another with a boom structure attached at each side, said pivotable frame means including a first plate oriented approximately perpendicular to the longitudinal axis of said implement;

slideable frame means for supporting said pivotable frame means, said slideable frame means having two spaced apart vertical tube members and a second plate extending therebetween, said first and second plates being in sliding contact with one another, said first and second plates for transmitting between said implement and said boom structures force components aligned perpendicular to said plates;

a pin passed substantially perpendicularly through both said first and second plates, said pin for pivotably supporting said pivotable frame means with respect to said slideable frame means, said pin being located with the center of gravity of said pivotable frame means with attached said boom structures beneath said pin;

fixed frame means, attached to said implement, for supporting said slideable frame means, said fixed frame means including two spaced apart, upstanding tube members slideably fitted within said vertical tube members of said slideable frame means;

a first hydraulic cylinder attached in a substantially vertical orientation between said fixed frame means and said slideable frame means for raising or lowering said slideable frame means with respect to said fixed frame means and holding said slideable frame means at a preselected elevated position;

a second hydraulic cylinder attached between said slideable frame means and said pivotable frame means for rotating said pivotable frame means with respect to said slideable frame means and holding said pivotable frame means in a preselected rotated position; and means for controllably operating said hydraulic cylinders.

16. A positioning apparatus in accordance with claim 15 wherein said second hydraulic cylinder has first and second ends, said second cylinder including between said first and second ends a body with a first retaining wall at said second end thereof and a rod extending from said first retaining wall, said rod having a second retaining wall fastened thereto spaced from said first retaining wall, said first end being attached to one of said pivotable and slideable frame means and said rod being slidably retained by a collar attached to the other of said pivotable and slideable frame means, said positioning apparatus further including first and second springs, said first and second springs being received about said rod between said first and second retaining walls, one of said first and second springs being on each side of said collar, whereby said hydraulic cylinder may be operated to pivot said pivotable frame means a preselected amount with respect to said slideable frame means and to hold said pivotable frame means in the preselected pivoted position, said first and second springs yieldably centering said pivotable frame means on the preselected pivoted position.

17. A positioning apparatus in accordance with claim 16 further including shock absorber means, attached between said first and second frame means, for damping relative oscillation movements between said pivotable and slideable frame means, whereby when said pivotable and slideable frame means pivot with respect to one another due to an external force, said first and second springs force said pivotable frame means to return to said preselected pivoted position with respect to said slideable frame means, said shock absorber means damping any oscillatory motion due to said springs.

18. A positioning apparatus in accordance with claims 8 or 17 including third and fourth hydraulic cylinders, attached between said pivotable frame means and said boom structures, for moving said boom structures between a transit configuration aligned substantially parallel to the longitudinal axis of said implement and an operational configuration aligned substantially perpendicular to the longitudinal axis of said implement.

* * * * *

UNITED STATES PATENT AND TRADEMARK OFFICE
CERTIFICATE OF CORRECTION

PATENT NO. : 4,344,572

DATED : August 17, 1982

INVENTOR(S) : Loren E. Tyler

It is certified that error appears in the above—identified patent and that said Letters Patent is hereby corrected as shown below:

Column 4, line 28, after "ground" delete "an" (first occurrence) and insert therefor --or--.

Column 6, line 2, after "the" insert --long--.

Column 7, line 46, after "pair" insert --of--.

Column 8, line 53, after "pair" insert --of--.

Signed and Sealed this

Nineteenth Day of October 1982

[SEAL]

Attest:

Attesting Officer

GERALD J. MOSSINGHOFF

Commissioner of Patents and Trademarks